United States Patent
Kojo (10) Patent No.: US 10,160,450 B2
(45) Date of Patent: Dec. 25, 2018

(54) TRAVEL CONTROL DEVICE FOR VEHICLE

(71) Applicant: SUBARU CORPORATION, Tokyo (JP)

(72) Inventor: Hiroshi Kojo, Tokyo (JP)

(73) Assignee: Subaru Corporation, Tokyo (JP)

( * ) Notice: Subject to any disclaimer, the term of this patent is extended or adjusted under 35 U.S.C. 154(b) by 45 days.

(21) Appl. No.: 15/596,511

(22) Filed: May 16, 2017

(65) Prior Publication Data

US 2017/0361841 A1    Dec. 21, 2017

(30) Foreign Application Priority Data

Jun. 17, 2016    (JP) ................. 2016-120679

(51) Int. Cl.
    *B60W 30/16*      (2012.01)
    *B60W 30/09*      (2012.01)
    *B60W 50/14*      (2012.01)

(52) U.S. Cl.
    CPC ............ *B60W 30/16* (2013.01); *B60W 30/09* (2013.01); *B60W 2050/143* (2013.01); *B60W 2050/146* (2013.01); *B60W 2420/42* (2013.01)

(58) Field of Classification Search
    CPC .. B60W 30/16; B60W 30/09; B60W 2420/42; B60W 2050/146; B60W 2050/143
    See application file for complete search history.

(56) References Cited

U.S. PATENT DOCUMENTS

2016/0362105 A1*    12/2016    Kwon .................. B60W 30/14

FOREIGN PATENT DOCUMENTS

| JP | H11-175897 | 7/1999 |
|---|---|---|
| JP | 2002-236994 A | 8/2002 |
| JP | 2005-138748 A | 6/2005 |

(Continued)

OTHER PUBLICATIONS

Decision to Grant issued in corresponding Japanese Patent Application No. 2016-120679, dated Jul. 3, 2018.

(Continued)

*Primary Examiner* — Yuen H Wong
(74) *Attorney, Agent, or Firm* — McDermott Will & Emery LLP (57) ABSTRACT

A travel control device for a vehicle includes a forward information acquirer, a following travel controller, and a preceding-vehicle start detector. The forward information acquirer acquires information ahead of the vehicle. The following travel controller causes the vehicle to travel following a preceding vehicle when capturing the preceding vehicle travelling immediately ahead of the vehicle. The preceding-vehicle start detector detects a start of the preceding vehicle. The following travel controller includes a turning following controller that controls a stop and a start of the vehicle when the vehicle follows the preceding vehicle and enters an intersection to turn toward an opposite lane. The turning following controller includes an oncoming vehicle approach estimator and a stop controller. The oncoming vehicle approach estimator obtains an acceleration after the preceding vehicle starts. The stop controller stops and holds the vehicle at a waiting position of the intersection without causing the vehicle to follow the preceding vehicle.

4 Claims, 10 Drawing Sheets

(56) References Cited

FOREIGN PATENT DOCUMENTS

| JP | 2006-323876 A | 11/2006 |
| JP | 2009-126433 A | 6/2009 |
| JP | 2010-072772 A | 4/2010 |
| JP | 2013-068178 A | 4/2013 |

OTHER PUBLICATIONS

Notice of Reasons for Refusal issued in corresponding Japanese Patent Application No. 2016-120679, dated Apr. 24, 2018.

* cited by examiner

TRAVEL CONTROL DEVICE FOR VEHICLE

CROSS-REFERENCE TO RELATED APPLICATIONS

The present application claims priority from Japanese Patent Application No. 2016-120679 filed on Jun. 17, 2016, the entire contents of which are hereby incorporated by reference.

BACKGROUND

1. Technical Field

The present invention relates to a travel control device for a vehicle that allows the vehicle to follow a preceding vehicle and automatically start and stop.

2. Related Art

Up to now, an automatic inter-vehicle distance maintaining control (adaptive cruise control (ACC)) system has been known in which a constant speed travel control for maintaining a set vehicle speed is performed when there is no preceding vehicle, and a following travel control for causing a vehicle to follow the preceding vehicle in a state to maintain a following inter-vehicle distance to a preceding vehicle is performed when the preceding vehicle is detected.

Recently, a system in which an applicable range of the ACC system is expanded to a low speed range (from 0 [Km/h]) to provide a congestion following function has also been known. In the ACC system having the congestion following function, the vehicle travels following the detected preceding vehicle in a state to maintain the following inter-vehicle distance to the preceding vehicle and automatically stops and starts following a stop and a start of the preceding vehicle.

However, the vehicle equipped with the ACC system having the congestion following function follows the preceding vehicle on a general road, enters an intersection, and crosses an opposite lane in the same direction as that in which the preceding vehicle crosses the opposite lane, that is, tries to turn to the right in the case of the road of left hand traffic. In such a case, even if an oncoming vehicle approaches the intersection, if the vehicle starts following the preceding vehicle, the vehicle may come in contact with the oncoming vehicle. For that reason, in the case where the vehicle follows the preceding vehicle and enters the intersection, a driver pays attention to the oncoming vehicle approaching the intersection. When the driver recognizes the oncoming vehicle approaching, the driver is required to depress a brake pedal to cancel the ACC control or the like, to thereby avoid the contact with the preceding vehicle.

In that case, it is also predicted that a delay occurs in canceling the ACC control due to a driver's depression delay of the brake pedal. As a countermeasure, for instance, Patent Literature 1 (Japanese Unexamined Patent Application Publication No. 1999 (Hei 11)-175897) discloses a technique in which when the vehicle follows the preceding vehicle and reaches a vicinity of the intersection where the vehicle is to turn to the right or left, the ACC control is automatically cancelled, and thereafter, the ACC control is resumed when the vehicle has turned to the right or left at the intersection and crossed over the intersection.

According to the technique disclosed in the literature described above, when the vehicle reaches the vicinity of the intersection, the ACC control is automatically canceled irrespective of a driver's intention. For that reason, for instance, when the vehicle is about to turn (a right turn in a left hand traffic) in the same direction as that of the preceding vehicle, the driver is required to depress the brake pedal immediately after the ACC control has been canceled or the like to adjust the inter-vehicle distance to the preceding vehicle. A high responsiveness is required immediately after the ACC control has been canceled.

In particular, in the case where the vehicle is going to turn in a direction of crossing the opposite lane at the intersection (a right turn in the left hand traffic), the driver must pay attention to not only the oncoming vehicles traveling on the opposite lane, but also pedestrians walking on a sidewalk whom the vehicle is to going to cross and bicycles trying to cross a pedestrian crossing and so on. For that reason, it is also assumed that the driver has forgotten that the ACC control has been automatically canceled.

SUMMARY OF THE INVENTION

It is desirable to provide a travel control device for a vehicle that does not automatically cancel an ordinary ACC control even if a vehicle enters an intersection following a preceding vehicle, and that is capable of safely stopping and holding the vehicle when an oncoming vehicle is approaching the vehicle when the vehicle turns in a direction of crossing an opposite lane following the preceding vehicle.

An aspect of the present invention provides a travel control device for a vehicle including: a forward information acquirer configured to acquire information in front of the vehicle; a following travel controller configured to cause the vehicle to travel following the preceding vehicle when capturing a preceding vehicle that travels immediately in front of the vehicle based on the information acquired by the forward information acquirer; and a preceding vehicle start detector configured to detect, based on the information acquired by the forward information acquirer, a start of the preceding vehicle which is followed by the vehicle. The following travel controller includes a turning following controller configured to control a stop and a start of the vehicle when the vehicle follows the preceding vehicle and enters an intersection to turn in a direction of crossing an opposite lane. The turning following controller includes an oncoming vehicle approach estimator and a stop controller. The oncoming vehicle approach estimator is configured to obtain an acceleration after the preceding vehicle starts based on the information acquired by the forward information acquirer when the start of the preceding vehicle is detected by the preceding-vehicle start detector, and estimate, based on the acceleration, an approach of an oncoming vehicle that travels on the opposite lane. The stop controller is configured to stop and hold the vehicle at a waiting position of the intersection without causing the vehicle to follow the preceding vehicle when the oncoming vehicle approach estimator estimates the approach of the oncoming vehicle.

DETAILED DESCRIPTION

Figure 5:
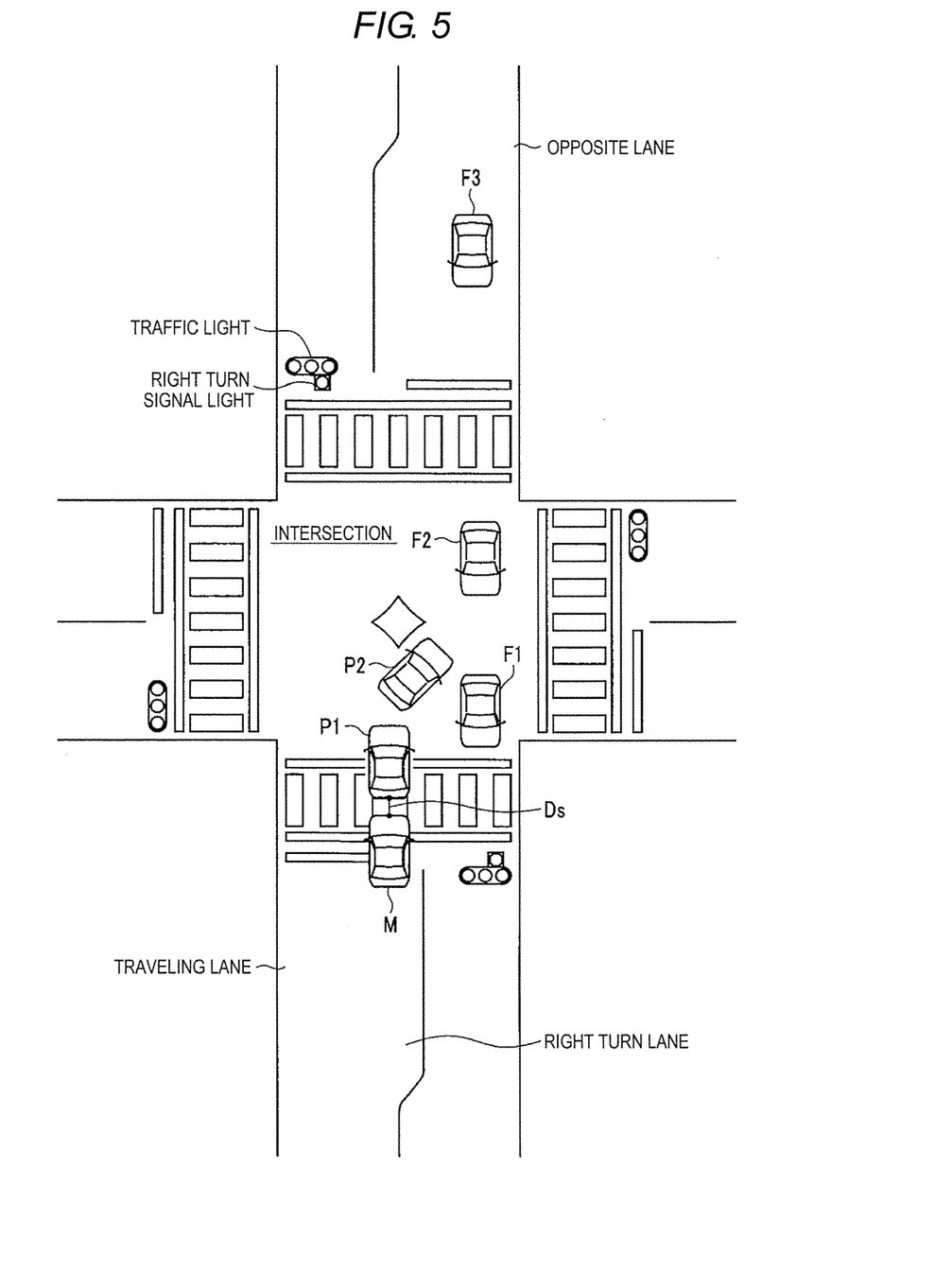
FIG. 5 is a bird's-eye view illustrating a state in which a vehicle traveling in a row on a right turn lane enters an intersection.

Hereinafter, an example according to the present invention will be described with reference to the drawings. FIG. 5 illustrates a vehicle entering an intersection, in which reference symbol M indicates a vehicle to which the example of the present invention is applied, P1 indicates a preceding vehicle traveling immediately before, and P2 indicates a second preceding vehicle traveling in front of the preceding vehicle P1. Also, reference symbols F1 to F3 are vehicles going straight ahead on an opposite lane. It should be noted that the figure illustrates the case of the left hand traffic, and in the case of a right hand traffic, the left and right are reversed. In addition, the intersection according to the present example is not limited to a crossroad as illustrated in the figure, but may be intended for a road where there is a need to cross an opposite lane when turning (turning right), such as a multi-way road typified by a T-shaped road or a three-way road.

The vehicle M and the preceding vehicles P1 and P2 travel on a right turn lane of a traveling lane and enter an intersection to turn to the right (turning), whereas the oncoming vehicles F1 to F3 are going straight on the opposite lane. Besides, among traffic lights installed at intersections, both of traffic lights of the traveling lane and the opposite lane are provided with a right turn signal light for indicating right turn allowed.

Figure 1:
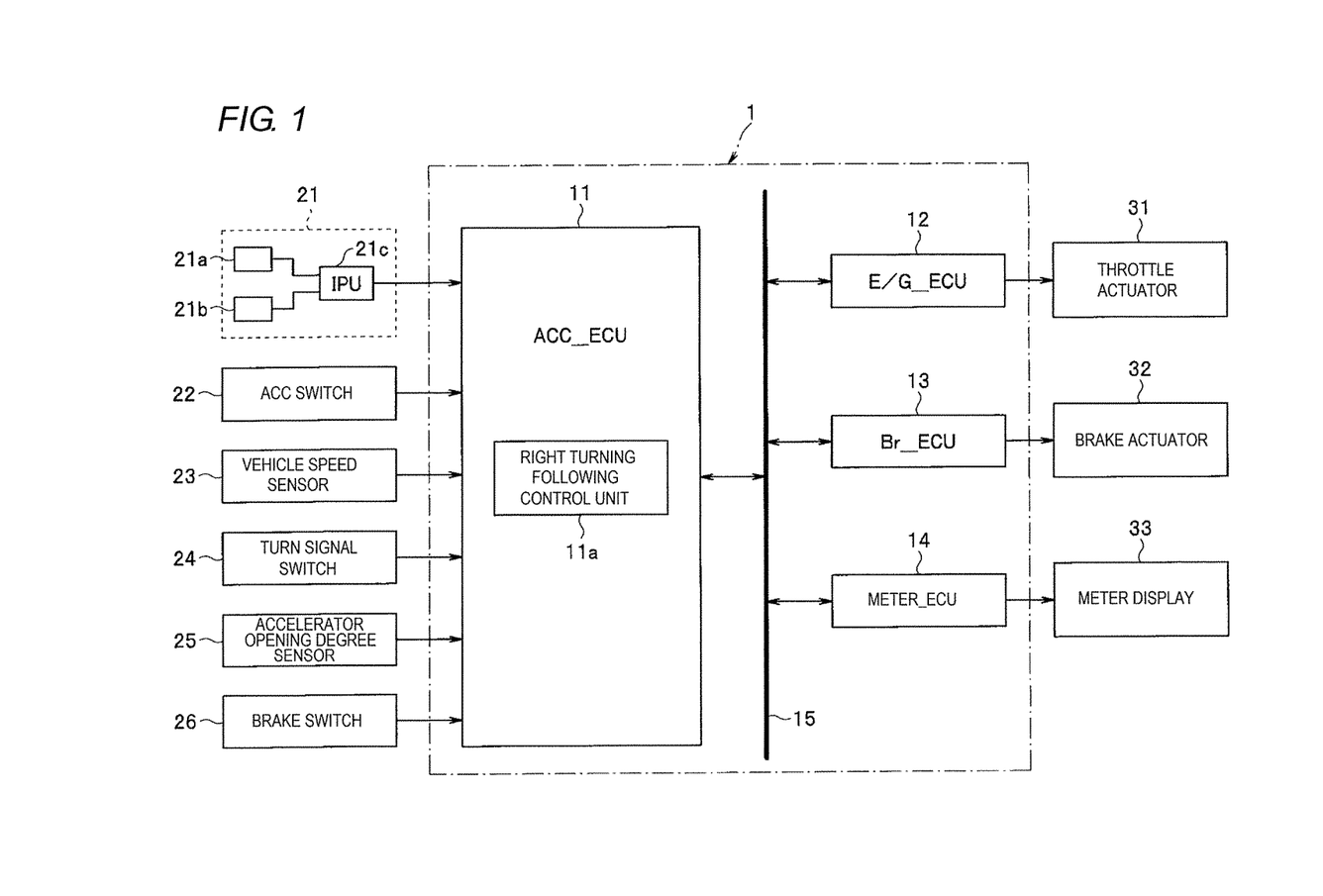
FIG. 1 is a configuration diagram of a travel support device.

A travel control device 1 illustrated in FIG. 1 is mounted in the vehicle M. The travel control device 1 includes various control units such as an ACC control unit (AC-C_ECU) 11, an engine control unit (E/G_ECU) 12, a brake control unit (Br_ECU) 13, and a meter control unit (meter_ECU) 14. In one example, the ACC_ECU 11 may serve as a "following travel controller". The respective control units 11 to 14 are bidirectionally communicably coupled to each other through an in-vehicle communication line 15 such as a CAN (controller area network). Each of the units 11 to 14 is mainly configured by a well-known microcomputer including a CPU, a ROM, a RAM, and the like. A control program for operating the CPU, which is set for each system, fixed data and the like are stored in the ROM.

A forward information acquisition device 21 is coupled to an input side of the ACC_ECU 11. The forward information acquisition device 21 has a stereo camera including a main camera 21a and a sub-camera 21b. In one example, the forward information acquisition device 21 may as a "forward information acquirer". Analog images of surrounding environments in front of the vehicle M, which are captured and acquired by the respective cameras 21a and 21b are subjected to predetermined image processing by an image processing unit (IPU) 21c, and are transmitted to the ACC_ECU 11.

An input side of the ACC_ECU 11 is further coupled to various sensors and switches including an ACC switch 22, a vehicle speed sensor 23 that detects a vehicle speed Vs of the vehicle M, a turn signal switch 24 that blinks a turn signal in the direction of turning when turning to the right or left, an accelerator opening degree sensor 25 that detects an accelerator opening degree θth which is a depression amount of an accelerator pedal, and a brake switch 26 which is turned on by depression of a brake pedal. In one example, the turn signal switch may serve as a "turning operation unit". Further, the ACC switch 22 is configured by a composite switch that is provided at a position where a driver can operate such as an instrument panel, a steering wheel, and the like, and performs a selection of any operation from normal operation (switch OFF) and ACC operation (switch ON), setting of a set vehicle speed during the ACC operation, a selection of any mode from following inter-vehicle modes ("long", "medium", "short"), on/off setting of an automatic following start control, and so on.

On the other hand, a throttle actuator 31 is coupled to an output side of the E/G_ECU 12. The throttle actuator 31 opens and closes a throttle valve of an electronically controlled throttle installed in a throttle body of an engine. The throttle actuator 31 opens and closes the throttle valve according to a drive signal from the E/G_ECU 12 to regulate an intake air flow rate, to thereby generate a desired engine output.

In addition, a brake actuator 32 is coupled to an output side of the Br_ECU 13. The brake actuator 32 regulates a brake hydraulic pressure to be supplied to a brake wheel cylinder installed in each wheel. When the brake actuator 32 is driven according to a drive signal from the Br_ECU 13, a braking force is generated for each wheel by the brake wheel cylinder, and the wheel is forcibly decelerated.

A meter display 33 is coupled to the meter_ECU 14. The meter display 33 is a so-called combination meter which is disposed in an instrument panel in front of a driver's seat. Various information such as a following cruise control display for notifying a state in which the preceding vehicle is followed and the following travel is being executed, a constant-speed cruise control display for notifying a constant-speed travel state, a stop holding display for notifying that the ACC is stopped and held (HOLD), and a display of the set vehicle speed, is displayed on the meter display 33 according to command signals from the meter_ECU 14. Further, a speaker, a buzzer, or the like for notifying the capture of the preceding vehicle and the start of the preceding vehicle is additionally provided in the meter display 33.

The ACC_ECU 11 checks whether the preceding vehicle P1 is traveling in front of the vehicle M based on a surrounding environment image in front of the vehicle M which has been subjected to image processing by the aid of the IPU 21c of the forward information acquisition device 21. If the preceding vehicle P1 is not captured, the ACC_ECU 11 executes the constant speed travel control (constant-speed cruise control) for causing the vehicle M to travel at the set vehicle speed. Further, if the preceding vehicle P1 is captured, the ACC_ECU 11 obtains an inter-vehicle distance between the preceding vehicle P1 and the vehicle M and a relative vehicle speed based on the information from the forward information acquisition device 21 and the vehicle speed Vs detected by the vehicle speed sensor 23.

Then, the ACC_ECU 11 sets a target following inter-vehicle distance (including a stop following inter-vehicle distance and a start following inter-vehicle distance) on the basis of the host vehicle speed Vs or a vehicle speed of the preceding vehicle P1. The ACC_ECU 11 transmits an acceleration command or a deceleration command to the E/G_ECU 12 and the Br_ECU 13 so that the host vehicle M holds the target following inter-vehicle distance to the preceding vehicle P1 and follows the preceding vehicle P1 on the basis of the target following inter-vehicle distance, the inter-vehicle distance between the preceding vehicle P1 and the vehicle M, and the relative vehicle speed.

Then, the E/G_ECU 12 causes the throttle actuator 31 to drive the throttle position, and the Br_ECU 13 causes the brake actuator 32 to regulate the brake hydraulic pressure (braking force), to thereby execute the following travel control (following cruise control). Specifically, the ACC control to be executed by the ACC_ECU 11 is processed according to an ACC control routine illustrated in FIG. 2 to be described later.

Incidentally, in general, in executing the following start after the following stop, the travel control is performed so as to start the vehicle M after checking an operation input such as depression of the accelerator pedal by the driver. On the other hand, the ACC_ECU 11 according to the present example is set to resume the following control (following cruise control) by automatically starting the vehicle M from a following stop state when the start of the preceding vehicle P1 has been detected.

Further, the ACC_ECU 11 has a right turning following control unit 11a that determines whether to cause the vehicle M to follow the preceding vehicle P1 or to wait for turning to the right according to a behavior of the preceding vehicle P1, when following the preceding vehicle P1 and attempting to turn to the right while crossing the opposite lane. In one example the right turning following control unit 11a may serve as a turning following controller.

In a state in which the vehicle M follows the preceding vehicle P1 to enter the intersection and is stopped following the preceding vehicle 91 waiting for the right turn, the ACC_ECU 11 leaves a stop following inter-vehicle distance Ds (refer to FIG. 5) set as the target following inter-vehicle distance to the preceding vehicle P1 so that the vehicle M is stopped and held (HOLD) by the brake holding. Then, when the ACC_ECU 11 confirms the start of the preceding vehicle P1 and the inter-vehicle distance reaches the start following inter-vehicle distance set as the target following inter-vehicle distance, the stop holding is canceled, and the vehicle M starts automatically.

However, even if the oncoming vehicle F1 traveling on the opposite lane exists in the distance when the preceding vehicle P1 turns to the right, the oncoming vehicle F1 may approach and enter the intersection when the vehicle M tries to turn to the right. For that reason, when the vehicle M crosses the opposite lane, the driver pays attention to the oncoming vehicle F1 and prepares to depress the brake pedal.

In order to support the driver at the time of turning to the right, the right turning following control unit 11a installed in the ACC_ECU 11 determines whether the vehicle M can turn to the right following the preceding vehicle P1 according to the behavior of the preceding vehicle P1. If it is determined that the right turning is difficult, the ACC_ECU 11 automatically decelerates the vehicle M and stops and holds the vehicle M in a waiting state for the right turn. The above right turning following control to be executed by the right turning following control unit 11a is processed according to a right turning following control routine illustrated in FIG. 3 to be described later.

Figure 2:
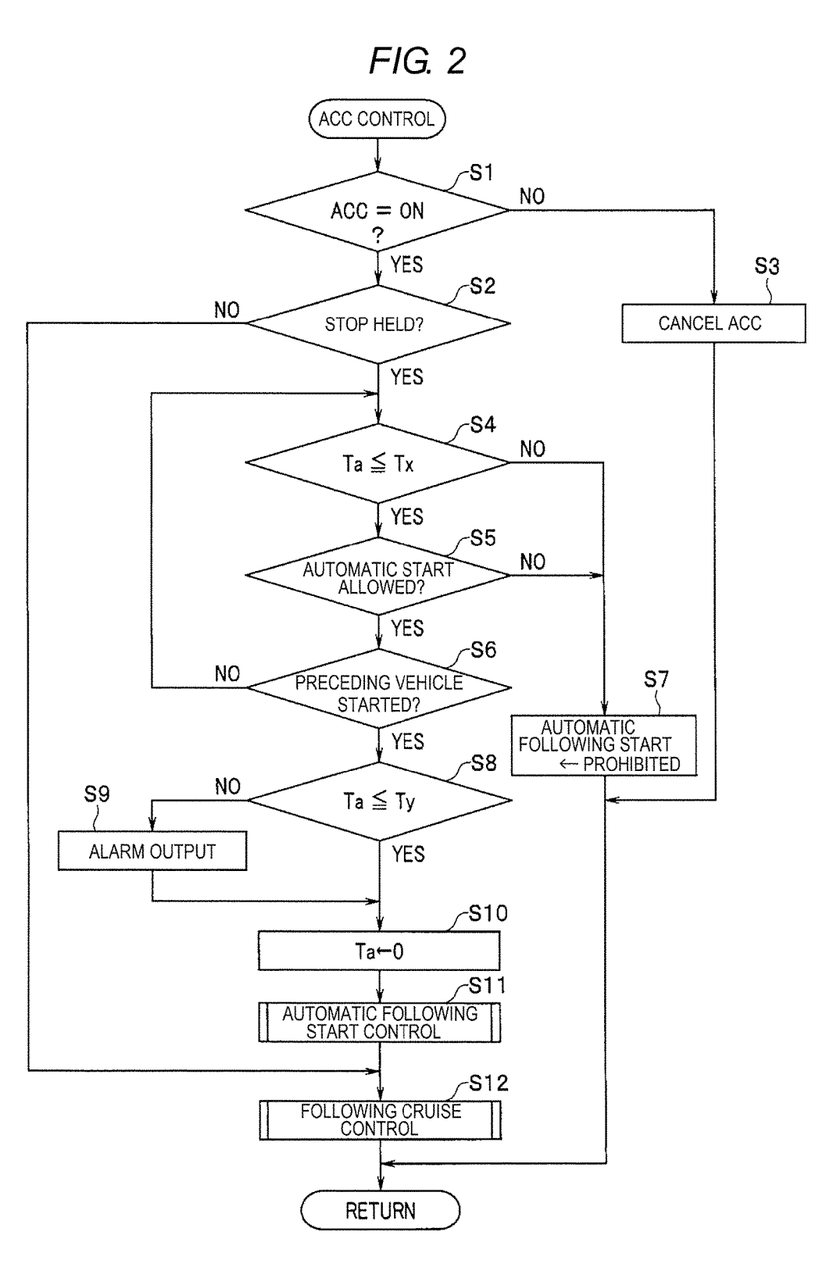
FIG. 2 is a flowchart illustrating an ACC control routine.

Next, the ACC control to be executed by the ACC_ECU 11 will be described according to the ACC control routine illustrated in FIG. 2.

In that routine, first, in step S1, it is checked whether the driver has turned on the ACC based on a signal from the ACC switch 22. If the ACC has been turned on, the routine proceeds to Step S2 whereas if the ACC is off, the routine is branched to Step S3 and the ACC control is canceled (CANCEL) and the routine is exited.

If it is determined that the ACC is on and the routine proceeds to Step S2, it is determined whether the vehicle M is in a stop holding state (HOLD), for instance, on the basis of whether a braking signal for implementing the brake holding to stop and hold the vehicle M has been transmitted to the Br_ECU 13 from the ACC_ECU 11. The state in which the ACC is on and the vehicle M is stopped and held is a state in which the vehicle M follows the preceding vehicle P1 and automatically stops while leaving a predetermined stop following inter-vehicle distance Ds. If the vehicle M is stopped and held (the braking signal is being transmitted), the routine proceeds to Step S4. On the other hand, if the stop holding is canceled (the braking cancel signal has been transmitted), the routine jumps to Step S12.

When the routine proceeds to Step S4, an elapsed time (stop holding elapsed time) Ta [sec] from the start of stop holding is counted. It is checked whether the stop holding elapsed time Ta has reached a predetermined automatic starting continuation permission time Tx (for instance, 30 To 60) [sec]. If the stop holding elapsed time Ta [sec] is within the automatic starting continuation permission time Tx [sec] (Ta≤Tx), the routine proceeds to Step S5. Also, when the stop holding elapsed time Ta [sec] has elapsed the automatic starting continuation permission time Tx [sec] (Ta>Tx), the routine branches to Step S7.

On the other hand, when the routine proceeds from Step S4 to Step S5, it is checked whether the automatic starting of the vehicle M is permitted. Whether the automatic starting is permitted is determined based on a recognition result by the forward information acquisition device 21. In other words, whether an interrupt of an obstacle such as a pedestrian or a bicycle is recognized between the preceding vehicle P1 and the vehicle M, or whether a possibility of such an interrupt (an obstacle is approaching a side of the vehicle M) is recognized is checked in the forward information acquisition device 21.

If an obstacle is not recognized between the preceding vehicle P1 and the vehicle M and no proximity of the obstacle is also detected, it is determined that automatic starting is permitted, and the routine proceeds to Step S6. On the other hand, when an obstacle is recognized between the preceding vehicle P1 and the vehicle M or when the approach of the obstacle is detected, it is determined that the automatic starting is prohibited, and the routine branches to Step S7. In other words, in this Step S5, only when the safety in front of the vehicle M is confirmed based on images captured by the cameras 21a and 21b, and the automatic starting is permitted, the routine proceeds to Step S6.

When the routine proceeds from Step S4 or Step S5 to Step S7, the automatic following start control is prohibited and the routine exits. When the automatic following start control is prohibited, the ACC_ECU 11 maintains a stop holding state of the vehicle M regardless of the presence or absence of the preceding vehicle P1 until an operation input such as the operation of turning on the ACC switch 22 by the driver or stepping on an accelerator pedal is confirmed.

In addition, the routine proceeds to Step S6, and it is checked whether the preceding vehicle P1 has started from the stopped state based on the images captured by the pair of cameras 21a and 21b installed in the forward information acquisition device 21. When the preceding vehicle P1 is maintained in the stopped state, in other words, if the inter-vehicle distance between the vehicle M and the preceding vehicle P1 is maintained at the stop following inter-vehicle distance Ds, the routine returns to Step S4. When the start of the preceding vehicle P1 is detected, in other words, if the inter-vehicle distance between the vehicle M and the preceding vehicle P1 exceeds the stop following inter-vehicle distance Ds, the routine proceeds to Step S8. In one example, the processing in step S6 may server as a "preceding vehicle start detector".

The routine proceeds to Step S8, and the stop holding elapsed time Ta from the start of the stop holding is compared with an automatic starting continuation permission time Ty. The automatic starting continuation permission time Ty is a threshold value for determining a time during which attention to the front of the driver decreases. The automatic starting continuation permission time Ty is set to about 3 [sec] in the present example, but is not limited to this value.

If the stop holding elapsed time Ta exceeds the automatic starting continuation permission time Ty (Ta>Ty), it is determined that a possibility that the attention to the front of the driver is reduced (oblivious, careless, or the like) is high, and the routine proceeds to Step S9. If the stop holding elapsed time Ta falls within the automatic starting continuation permission time Ty (Ta≤Ty), it is determined that the attention to the front of the driver is maintained, and the routine directly proceeds to Step S10.

The routine proceeds to Step S9 in which an alarm signal is outputted to the meter_ECU 14 and the routine proceeds to Step S10. On the basis of the alarm signal from the ACC_ECU 11, the meter_ECU 14 displays on the meter display 33 an image for calling attention to the front of the driver and notifies the attention by activating a voice, a buzzer or the like.

When the routine proceeds from Step S8 or Step S9 to Step S10, the stop holding elapsed time Ta is cleared (Ta→0), the routine proceeds to Step S11, the stop holding (HOLD) is canceled, the automatic following start control is executed, and the routine proceeds to Step S12. In the automatic following start control, when the inter-vehicle distance between the vehicle M and the preceding vehicle P1 recognized by the forward information acquisition device 21 reaches the start following inter-vehicle distance, the vehicle M follows the preceding vehicle P1 and automatically starts. After the vehicle M has reached a predetermined start vehicle speed (for instance, 5 to 15 [Km/h]), the routine proceeds to Step S12.

When the routine proceeds from Step S2 or Step S11 to Step S12, the normal ACC control (so-called following cruise control) is executed and the routine ends. Incidentally, the normal ACC control is disclosed in detail in Japanese Unexamined Patent Application Publication No. 2013-68178 and the like, and therefore a description of the normal ACC control will be omitted.

Figure 3:
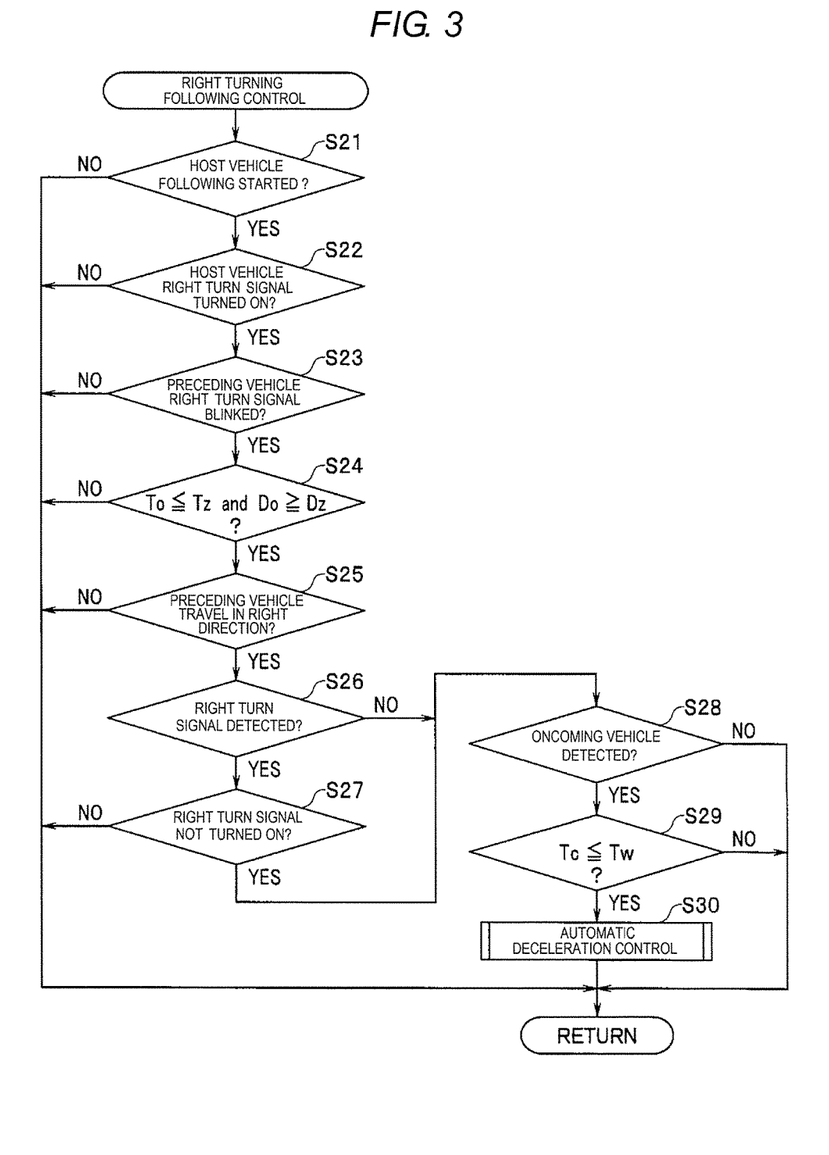
FIG. 3 is a flowchart illustrating a right turning following control routine.

Also, while the ACC_ECU 11 is executing the ACC control routine described above, the right turning following control unit 11a interrupts the ACC control routine to execute the right turning following control routine illustrated in FIG. 3. Accordingly, when the automatic deceleration control to be described later is not executed in the right turning following control routine, the ACC control is executed according to the ACC control routine in FIG. 2. The steering operation at the time of turning to the right is performed by the driver.

The above routine is started when the vehicle M stops following the preceding vehicle P1. First in Step S21, the routine waits until the following start of the vehicle M stopped and held in the ACC control routine described above is detected, and when the start of the vehicle M has been detected, the routine proceeds to Step S22.

The routine proceeds to Step S22, and a signal from the turn signal switch 24 is read, and it is checked whether a right turn signal of the vehicle M is on. If the right turn signal is off, it is determined that the driver does not intend to cause the vehicle M to turn to the right, and the routine exits as it is. On the other hand, if the right turn signal is on, it is determined that the driver intends to cause the vehicle M to turn to the right, and the routine proceeds to Step S23. Whether the vehicle M turns to the right may be determined based on a steering angle detected by a steering angle sensor, for instance. In one example, the processing in this step may serve as a "vehicle turning detector".

The routine proceeds to Step S23 in which it is determined whether a right rear turn signal is blinking, that is, whether the preceding vehicle P1 is going to turn to the right, according to an image of the right rear turn signal of the preceding vehicle P1, which is information acquired by the forward information acquisition device 21. In one example, the processing in this step may serve as a "preceding vehicle turning detector".

If the right rear turn signal is not blinking, it is determined that the preceding vehicle P1 is not willing to turn to the right and exits the routine. On the other hand, if blinking of the right rear turn signal is detected, it is determined that the preceding vehicle P1 is going to turn to the right, and the routine proceeds to Step S24.

In Step S24, a travel distance Do of the preceding vehicle P1 that has started and an elapsed time (elapsed time after start) To, which are acquired and recognized from the image of the forward information acquisition device 21 are measured, and it is checked whether the preceding vehicle P1 has traveled by a predetermined travel distance (set travel distance) Dz or more within a predetermined elapsed time (set elapsed time) Tz.

In general, when a vehicle such as the preceding vehicle P1 entering the intersection and waiting for a right turn tries to turn to the right, the vehicle accelerates and crosses an opposite lane. In particular, when a driver who drives the vehicle waiting for the right turn recognizes that an oncoming vehicle F1 traveling on the opposite lane approaches the intersection, the driver starts the vehicle at a greater acceleration so as to cross the opposite lane promptly. The set elapsed time Tz and the set travel distance Dz described above determine a behavior of trying to cross the opposite lane when the preceding vehicle P1 turns to the right. In the present example, Tz=2 [sec] and Do=10 [m] are set, but the present invention is not limited to those values.

When the travel distance Do when the set elapsed time Tz has elapsed has not reached the set travel distance Dz (To>Tz, Do<Dz), it is estimated that the preceding vehicle P1 maintains a right turn waiting state or that because a second preceding vehicle P2 (refer to FIGS. 5 and 6) has turned to the right turn, the preceding vehicle P1 has advanced at a very slow speed to a position where the second preceding vehicle P2 has been stopped, and the routine exits.

On the other hand, if it is determined that the travel distance Do within the set elapsed time Tz exceeds the set travel distance Dz (To≤Tz, Do≥Dz), it is estimated that the preceding vehicle P1 has started at a relatively large acceleration, whereby the oncoming vehicle F1 is approaching, and the routine proceeds to Step S25. In one example, the processing in Step S24 may serve as an "oncoming vehicle approach estimator".

The routine proceeds to Step S25, in which the travel of the preceding vehicle P1 in a lateral direction is detected based on the image captured and acquired by the forward information acquisition device 21, and it is checked whether the preceding vehicle P1 travels in a right direction with respect to a traveling direction of the vehicle M. If the travel in the right direction is not detected, it is determined that the preceding vehicle P1 has left the vehicle M without turning to the right after starting, and the routine exits as it is. If it is determined that the preceding vehicle P1 travels in the right direction with respect to the traveling direction of the vehicle M, the routine proceeds to Step S26.

When the routine proceeds to Step S26, it is checked whether a right turn signal light is installed in a traffic light based on the image captured and acquired by the forward information acquisition device 21. If the right turn signal light is installed, the routine proceeds to Step S27, and if the right turn signal light is not installed, the routine jumps to Step S28. When the routine proceeds to Step S27, it is checked whether the right turn signal light is lit, and if the right turn signal light is lit, the routine exits as it is. On the other hand, if the right turn signal light is not lit, the routine proceeds to Step S28. When the right turn signal light is lit, because the oncoming vehicle F1 traveling on the opposite lane is stopped at a stop line before the intersection and will not enter the intersection, the normal ACC control (following cruise control) is executed.

When the routine proceeds from Step S26 or Step S27 to Step S28, it is verified whether the oncoming vehicle F1 is actually approaching according to the image captured and acquired by the forward information acquisition device 21. If the oncoming vehicle F1 is not detected, the routine exits as it is. When a forward recognition distance of the two cameras 21a and 21b mounted in the forward information acquisition device 21 is, for instance, 50 to 80 [m], the oncoming vehicle F1 does not exist before at least 50 to 80 [m]. For that reason, the vehicle M follows the preceding vehicle P1 under the normal ACC control, and turns to the right after crossing the opposite lane. Whether the oncoming vehicle F1 is stopped at the stop line can be determined in Step S28, and therefore the processing in Steps S26 and S27 can be omitted.

On the other hand, if it is determined in Step S28 that the oncoming vehicle F1 has been detected, the routine proceeds to Step S29 in which a vehicle speed of the oncoming vehicle F1 and a distance to the oncoming vehicle F1 are calculated from the image captured by the forward information acquisition device 21, an oncoming vehicle F1 (arrival time) Tc required until the oncoming vehicle F1 reaches the vehicle M is obtained based on the calculated vehicle speed and distance, and the arrival time Tc is compared with a predetermined crossing time Tw. The crossing time Tw is a time during which the vehicle M can cross the opposite lane before the oncoming vehicle F1 reaches the vehicle M. The crossing time Tw is set based on a start acceleration under the ACC control of the vehicle M, a vehicle width of the opposite lane obtained based on the image captured by the forward information acquisition device 21, and the like.

If Tc>Tw is met, the routine exits as it is and the vehicle M turns to the right following the preceding vehicle P1 under the normal ACC control. On the other hand, if Tc≤Tw is met, it is determined that it is difficult for the vehicle M to cross the opposite lane, and the routine proceeds to Step S30. In one example, the processing in Step S29 may serve as a "following start determiner".

The routine proceeds to Step S30 in which an automatic deceleration control is executed in preference to the normal ACC control (following cruise control), and the routine is exited. The automatic deceleration control in Step S30 is executed according to an automatic deceleration control subroutine illustrated in FIG. 4. In one example, the processing in this step may serve as a "stop controller".

Figure 4:
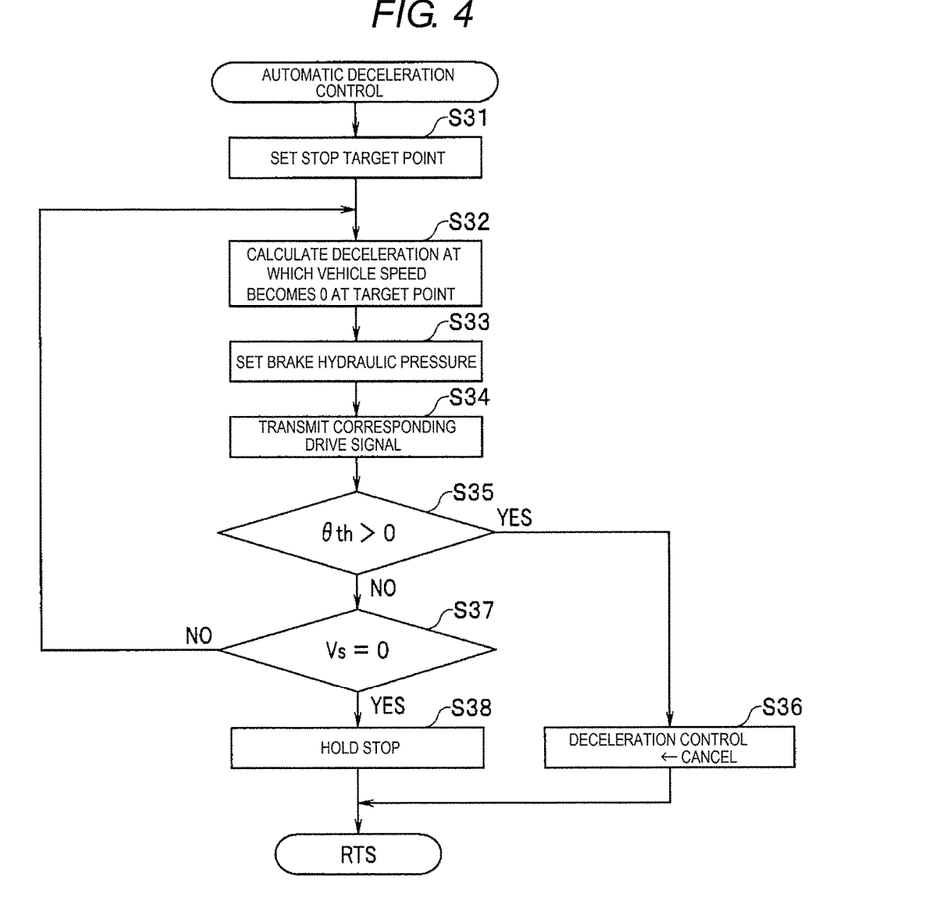
FIG. 4 is a flowchart illustrating an automatic deceleration control subroutine.

In the subroutine, first, in Step S31, a right turn waiting stop position of the intersection or a stop waiting position of the preceding vehicle P1 which has stopped for the right turning waiting is recognized based on the image captured and acquired by the forward information acquisition device 21, and the waiting position thus recognized is set as a stop target point.

Subsequently, the routine proceeds to Step S32 to calculate a deceleration at which the vehicle speed becomes 0 [Km/h] at the stop target point. The routine proceeds to Step S33 to set a corresponding brake hydraulic pressure, a corresponding drive signal is transmitted to the Br_ECU 13 in Step S34, and the routine proceeds to Step S35. Then, the Br_ECU 13 operates the brake actuator 32, regulates the brake hydraulic pressure to be supplied to the brake wheel cylinders of the respective wheels, generates a predetermined braking force, and decelerates the vehicle M.

Then, the routine proceeds to Step S35 in which it is checked whether the accelerator opening degree θth of the accelerator pedal detected by the accelerator opening degree sensor 25 is 0 [deg], that is, whether the driver depresses the accelerator pedal. If the driver depresses the accelerator pedal (θth>0), the routine branches to Step S36 so as to prioritize the driver's operation, and the automatic deceleration control is canceled and the routine is exited.

On the other hand, if the accelerator pedal is released (θth=0), the routine proceeds to Step S37 in a state where the automatic deceleration control is continued, and it is checked whether the vehicle speed Vs detected by the vehicle speed sensor 23 reaches 0 [Km/h]. If the vehicle M is not stopped (Vs>0), the routine returns to Step S32 to continue the deceleration control.

On the other hand, if it is determined in Step S37 that the vehicle M has stopped (Vs=0), the routine proceeds to Step S38 in which the vehicle M is stopped and held (HOLD) by brake hold and the routine is exited. As a result, the vehicle M advances at a low speed to a position where the preceding vehicle P1 has waited for the right turn, is automatically stopped, and puts into a right turn waiting state. Then, if the oncoming vehicle F1 waits at the traffic light or passes through the vehicle M and another oncoming vehicle F2 is not approaching behind the oncoming vehicle F1 and it is determined that crossing is possible, the vehicle M performs automatic start under the normal ACC control (Following cruise control).

Figure 7:
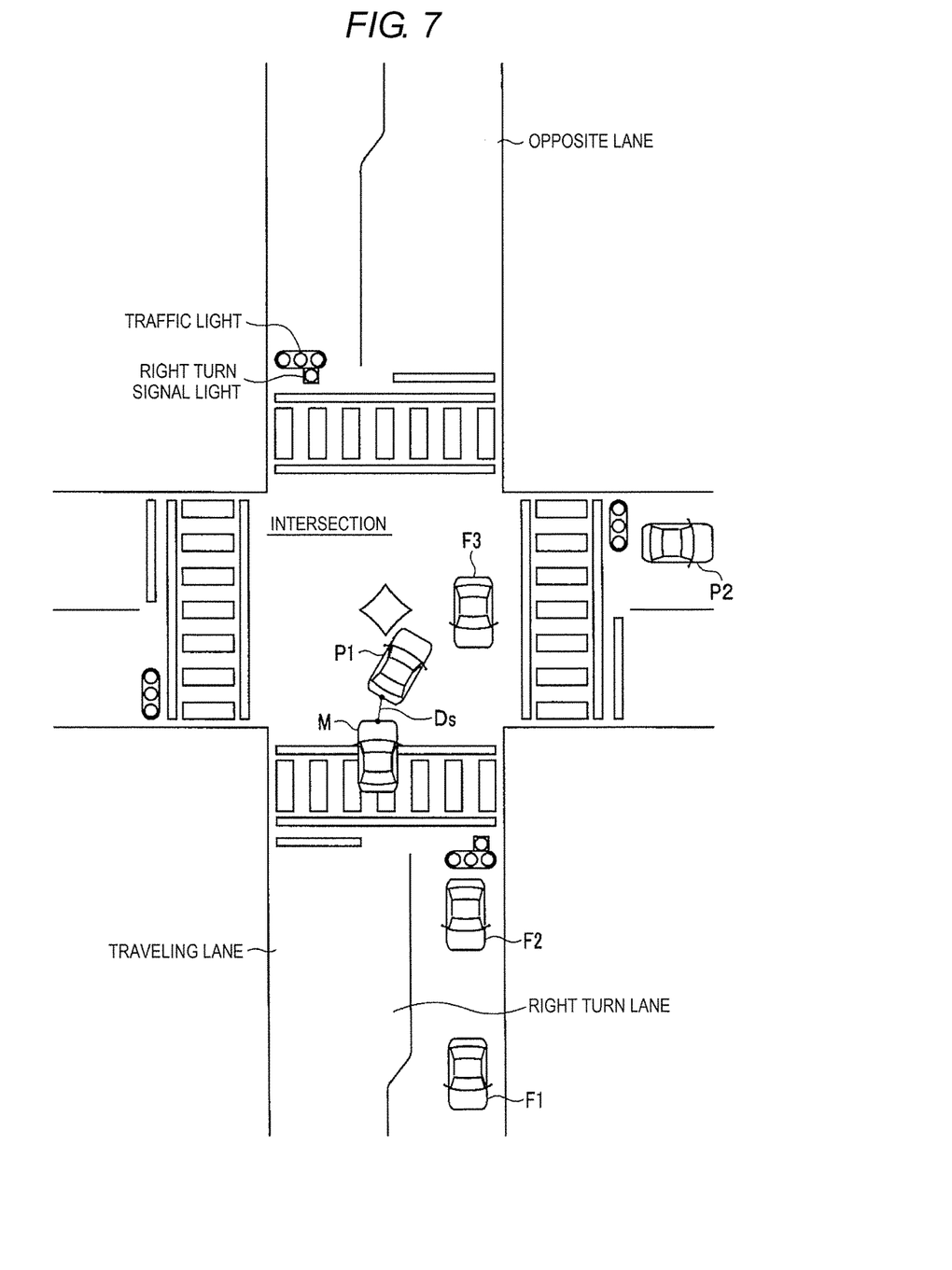
FIG. 7 is a bird's-eye view illustrating a state in which the vehicle follows the preceding vehicle in FIG. 6 to shorten the inter-vehicle distance between those vehicles.
Figure 8:
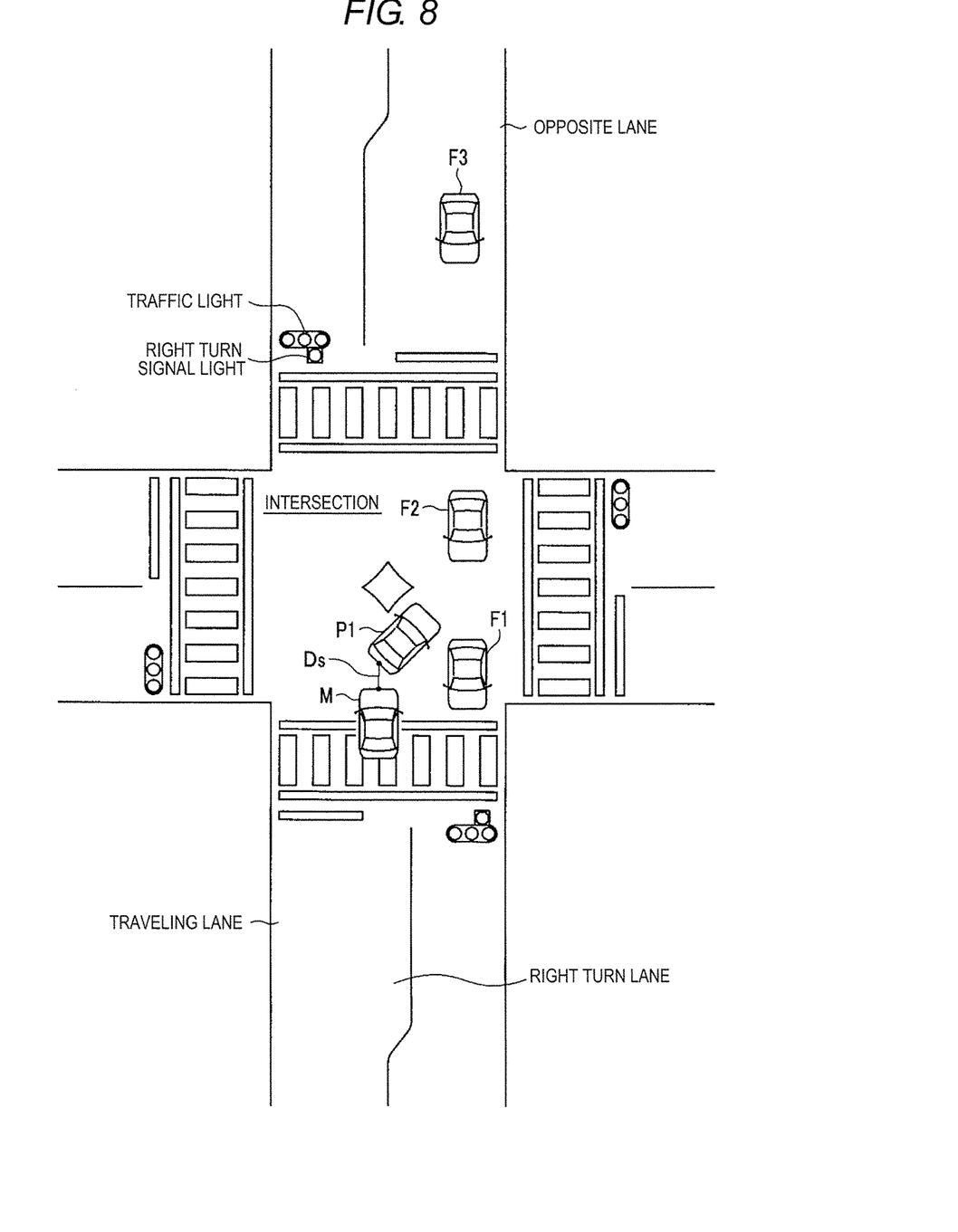
FIG. 8 is a bird's-eye view of a state in which the vehicle follows the preceding vehicle and is waiting for a right turn.
Figure 9:
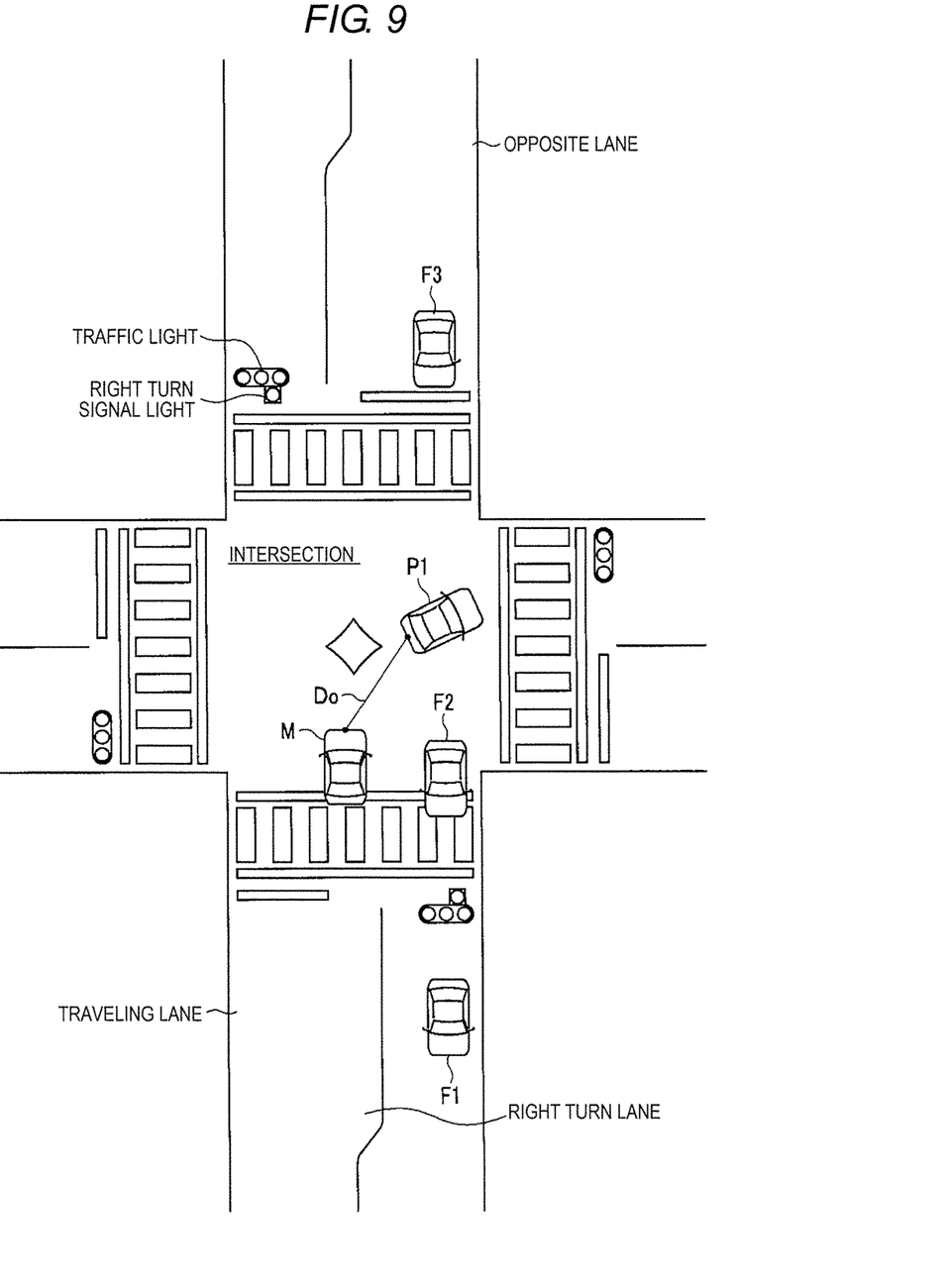
FIG. 9 is a bird's-eye view of a state in which the preceding vehicle in FIG. 7 turns to the right.
Figure 10:
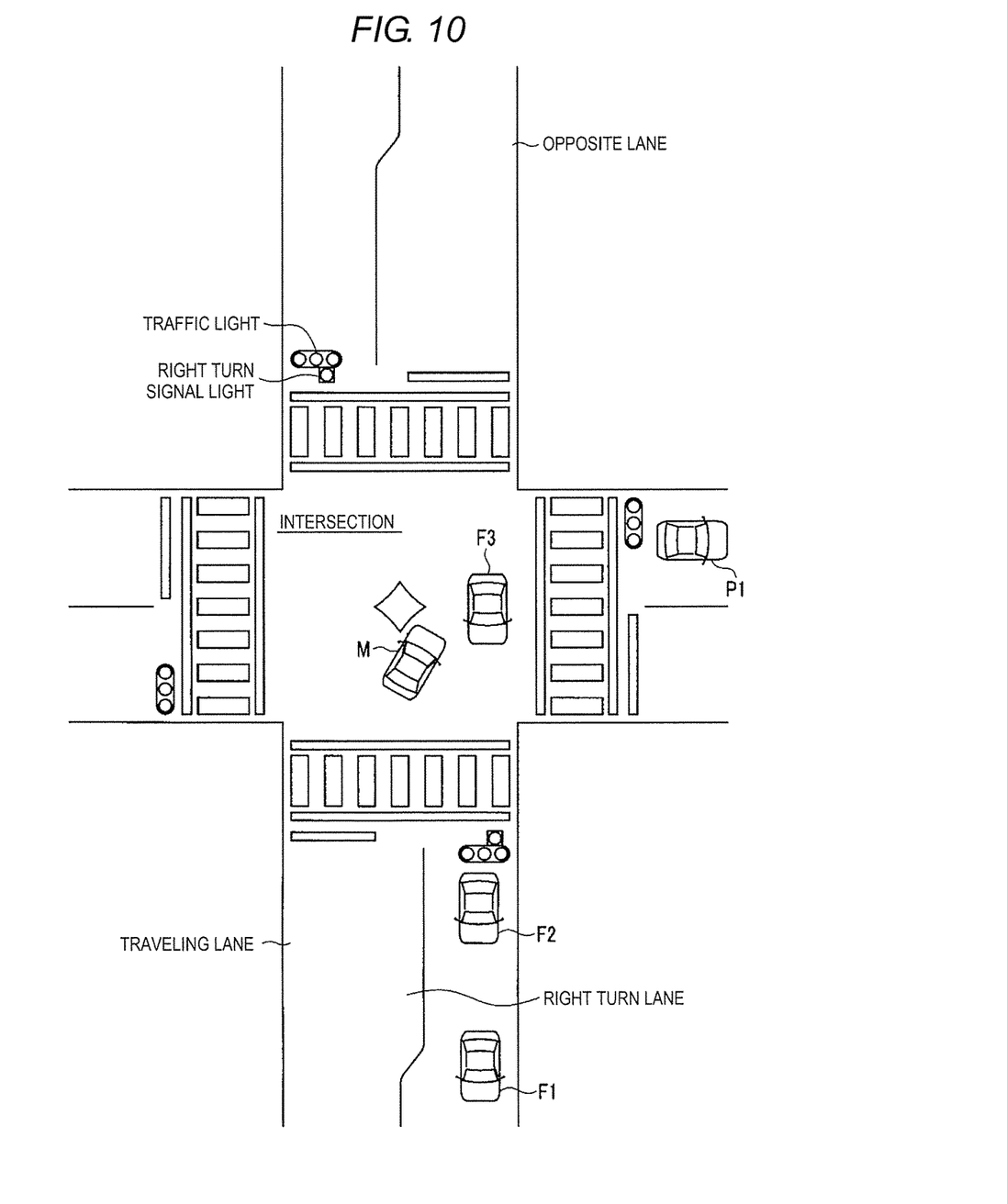
FIG. 10 is a bird's-eye view of a state in which the vehicle is stopped and held at the right turn waiting position of the intersection.

Next, an example of control when the vehicle M turns to the right following the preceding vehicle P1 will be described with reference to a mode in which three vehicles including the vehicle M, the preceding vehicle P1, and the second preceding vehicle P2 are waiting for the right turn illustrated in FIG. 5 to FIG. 7 and a mode in which two vehicles including the vehicle M and the preceding vehicle P1 illustrated in FIGS. 8 to 10 are waiting for the right turn according to the flowcharts of FIGS. 2 to 4 described above.

<Following Control in a State where Three Vehicles are Waiting for the Right Turn>

As illustrated in FIG. 5, when the vehicle M enters the intersection following the preceding vehicle P1 attempting to turn to the right according to the normal ACC control (S12) and the stop of the preceding vehicle P1 is detected, the vehicle M is stopped and held at the predetermined stop following inter-vehicle distance Ds.

Figure 6:
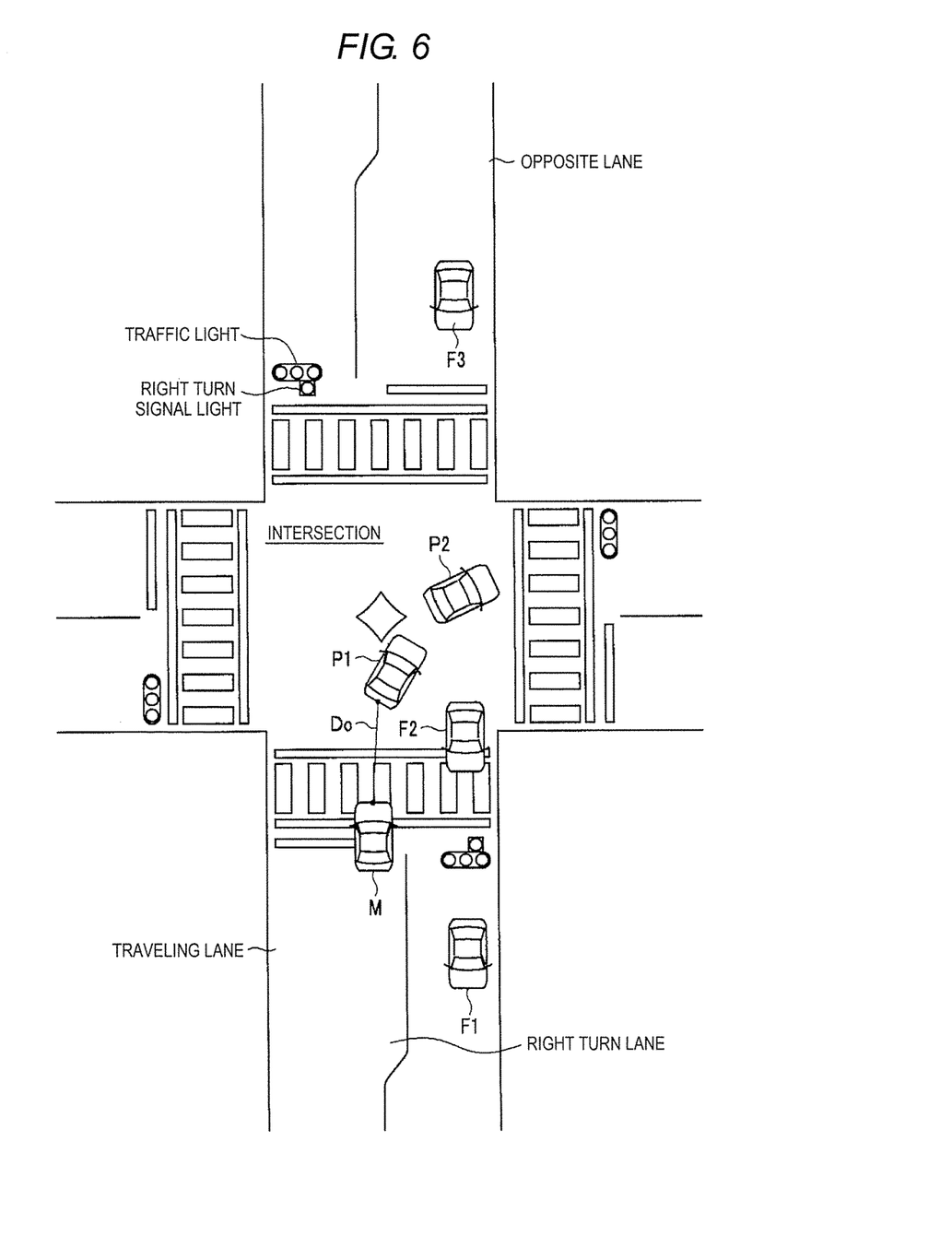
FIG. 6 is a bird's-eye view illustrating a state in which an inter-vehicle distance between a vehicle and a preceding vehicle in FIG. 5 is long.

Meanwhile, as illustrated in FIG. 6, the second preceding vehicle P2 is stopped and held until the oncoming vehicle F1 entering the intersection and the subsequent oncoming vehicle F2 pass through the intersection, and when an inter-vehicle distance between the subsequent oncoming vehicle F2 and the second subsequent oncoming vehicle F3 is sufficiently long, the second preceding vehicle P2 crosses the opposite lane at a timing when the subsequent oncoming vehicle F2 passes through the intersection and turns to the right.

When the preceding vehicle P1 has confirmed the right turn of the second preceding vehicle P2, the preceding vehicle P1 advances at a very slow speed to a right turn top position of the intersection, that is, a position where the second preceding vehicle P2 has waited for the right turn and then stops. Then, when the travel distance Do as the inter-vehicle distance to the preceding vehicle P1 has reached the start following inter-vehicle distance, the vehicle M starts following the preceding vehicle P1 (S11, state in FIG. 6), thereafter shifts to the normal ACC control, and stops at the stop following inter-vehicle distance Ds to the preceding vehicle P1 (S12, state of FIG. 7).

In this situation, in the right turning following control routine illustrated in FIG. 3, in Steps S22 and S23, whether the vehicle M and the preceding vehicle P1 turn to the right is confirmed according to an operating state of the right turn signal. Further, in Step S24, it is determined according to the travel distance Do of the preceding vehicle P1 per set elapsed time Tz whether the preceding vehicle P1 turns to the right across the opposite lane or merely travels to the right turn top position of the intersection.

As described above, the set elapsed time Tz and the set travel distance Dz are used to determine the behavior of trying to cross the opposite lane when the preceding vehicle P1 turns to the right. If the preceding vehicle P1 is to merely travel to the right turn top position of the intersection, the preceding vehicle P1 merely advances at a very slow speed by at least a distance obtained by adding an inter-vehicle distance between the preceding vehicle P1 and the second preceding vehicle P2 to front and rear lengths of the second preceding vehicle P2. Therefore, the travel distance Do at the time (To=Tz) when the elapsed time after start To has reached the set elapsed time Tz is shorter than the set travel distance Dz (Do<Dz), and the right turning following control is not substantially executed. As a result, the normal ACC control is executed, and the vehicle M follows the preceding vehicle P1 and is stopped and held at the stop following inter-vehicle distance Ds (S12).

<Following Control in a State where Two Vehicles are Waiting for the Right Turn>

As illustrated in FIG. 8, the vehicle M that has entered the intersection following the preceding vehicle P1 attempting to turn to the right is stopped at the stop following inter-vehicle distance Ds from the preceding vehicle P1. Then, as illustrated in FIG. 9, the preceding vehicle P1 confirms the passing of the oncoming vehicle F1 that goes straight on the opposite lane and the subsequent oncoming vehicle F2, and turns to the right while passing between the subsequent oncoming vehicle F2 and the second subsequent oncoming vehicle F3 at a predetermined timing, and then the vehicle M tries to start following the preceding vehicle P1 (S11).

At this time, in the right turning following control routine, the routine proceeds from Step S21 to Steps S22 and S23. When the right turn signals of the preceding vehicle P1 and the vehicle M are operated together, the routine proceeds to Step S24 in which it is checked whether the preceding vehicle P1 has traveled over the set travel distance Dz within the set elapsed time Tz. In general, as illustrated in FIG. 9, when the driver who drives the preceding vehicle P1 tries to turn to the right when the oncoming vehicle F3 intends to enter the intersection, the driver tries to cross the opposite lane in a short time, in other words, with a comparatively large starting acceleration rather than the normal starting acceleration at the time of turning to the right.

For that reason, in Step S24 of the right turning following control routine, To≤Tz and Do≥Dz are met, and it is estimated that the oncoming vehicle F1 is approaching. Then, if it can be confirmed in Step S25 that the preceding vehicle P1 has traveled in the right direction, it is determined that the preceding vehicle P1 has actually turned to the right. Thereafter, in Step S28, whether the oncoming vehicle F1 is actually approaching is verified based on the image captured and acquired by the forward information acquisition device 21. When the oncoming vehicle F3 has been detected, it is checked in Step S29 whether the arrival time Tc of the oncoming vehicle F3 to the vehicle M is shorter than the crossing time Tw.

Then, when it is determined that the arrival time Tc to the vehicle M is shorter than the crossing time Tw (Tc<Tw), it is estimated that the vehicle M hardly crosses the opposite lane, and the automatic deceleration control is executed (S30). As a result, as illustrated in FIG. 10, the vehicle M advances at a very slow speed to the right turn top position of the intersection and is stopped and held so as to be prevented from jumping out to the opposite lane side.

In this manner, in the ACC_ECU 11 according to the present example, in addition to the normal ACC control, the right turning following control unit 11a executes the right turn following control. The right turning following control unit 11a estimates whether the oncoming vehicle F1 is approaching based on the starting acceleration from a state in which the preceding vehicle P1 waits for the right turning. When it is estimated that the oncoming vehicle F1 is approaching, the vehicle M is basically prevented from turning to the right following the preceding vehicle P1. As a result, the vehicle M can be prevented from jumping out to the opposite lane side beforehand. Since the approach of the oncoming vehicle F1 is estimated on the basis of the starting acceleration of the preceding vehicle P1, a quick action can be taken before verifying the actual approach of the preceding vehicle F1 based on the image from the forward information acquisition device 21.

In addition, when estimating that it is difficult to cross the opposite lane, the right turning following control unit 11a can safely stop and hold the vehicle M at the intersection by causing the vehicle M to wait for the right turning at the intersection. Furthermore, since it is verified whether the oncoming vehicle F1 is actually approaching based on the image captured by the forward information acquisition device 21, double security can be secured.

Furthermore, even if the vehicle M enters the intersection following the preceding vehicle P1, because the automatic following start control is continued without causing the ACC control to be automatically canceled, high convenience can be obtained.

The present invention is not limited to the above-described example. For instance, the forward information acquisition device 21 is not limited to the stereo camera, but may be configured by the combination of a monocular camera and a distance sensor (millimeter-wave radar, acoustic wave radar, laser radar or the like).

The invention claimed is:

1. A travel control device for a vehicle comprising:
one or more cameras configured to acquire information in front of the vehicle;
an adaptive cruise control controller configured to:
  cause the vehicle to travel following a preceding vehicle when capturing the preceding vehicle that travels immediately in front of the vehicle based on the information acquired by the one or more cameras; and
  detect, based on the information acquired by the one or more cameras, a start of the preceding vehicle which is followed by the vehicle,
wherein the adaptive cruise control controller further comprises a turning following controller configured to:
  control a stop and a start of the vehicle when the vehicle follows the preceding vehicle and enters an intersection to turn in a direction of crossing an opposite lane,
  obtain an acceleration of the vehicle after the preceding vehicle starts based on the information acquired by the one or more cameras when the start of the preceding vehicle is detected by the one or more cameras,
  estimate, based on the acceleration, an approach of an oncoming vehicle that travels on the opposite lane,
  set a stop target point at the intersection after the preceding vehicle starts based on the information acquired by the forward information acquirer and
  stop and hold the vehicle at stop target point at the intersection without causing the vehicle to follow the preceding vehicle when the turning following controller estimates the approach of the oncoming vehicle with an arrival time when the oncoming vehicle traveling on the opposite lane is actually detected by the one or more cameras, the arrival time being a time required for the oncoming vehicle arrives at the intersection.

2. The travel control device for the vehicle according to claim 1, wherein the turning following controller is configured to:
  detect a turning of the vehicle in a direction of crossing the opposite lane based on a signal from a turning operation unit mountable on the vehicle; and
  detect a turning in a direction of crossing the opposite lane of the preceding vehicle based on the information acquired by the one or more cameras, and
wherein the turning following controller stops and holds the vehicle at the stop target point set at the intersection when the vehicle turning detector detects the turning of the vehicle in the direction of crossing the opposite lane, the turning of the preceding vehicle in the direction of crossing the opposite lane, and the turning following controller estimates the approach of the oncoming vehicle.

3. The travel control device for the vehicle according to claim 2, wherein the turning following controller is configured to:
  obtain the arrival time, and
  cause the vehicle to start following the preceding vehicle when the arrival time is longer than a time during which the vehicle is capable of crossing the opposite lane at the intersection.

4. The travel control device for the vehicle according to claim 1, wherein the turning following controller is configured to:
  obtain the arrival time, and
  cause the vehicle to start following the preceding vehicle when the arrival time is longer than a time during which the vehicle is capable of crossing the opposite lane at the intersection.

* * * * *